(12) United States Patent
Ramos (10) Patent No.: US 9,305,036 B2
(45) Date of Patent: Apr. 5, 2016

(54) DATA SET MANAGEMENT USING TRANSIENT DATA STRUCTURES

(71) Applicant: International Business Machines Corporation, Armonk, NY (US)

(72) Inventor: Reinaldo G. Ramos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 14/226,887

(22) Filed: Mar. 27, 2014

(65) Prior Publication Data

US 2015/0278260 A1    Oct. 1, 2015

(51) Int. Cl.
*G06F 17/30*    (2006.01)

(52) U.S. Cl.
CPC .... *G06F 17/30312* (2013.01); *G06F 17/30368* (2013.01)

(58) Field of Classification Search
USPC ................................ 707/609, 802
See application file for complete search history.

(56) References Cited

U.S. PATENT DOCUMENTS

| | | | |
|---|---|---|---|
| 5,765,165 A | 6/1998 | Harper | |
| 6,188,695 B1 * | 2/2001 | Przybysz | H04Q 3/0029 370/410 |
| 7,139,778 B2 * | 11/2006 | Chaudhuri | G06F 17/30595 707/717 |
| 7,398,484 B2 | 7/2008 | Ruf | |
| 7,467,151 B2 | 12/2008 | Kurupati et al. | |
| 8,122,098 B1 * | 2/2012 | Richardson | H04L 61/1511 709/217 |
| 8,321,858 B1 * | 11/2012 | Marmaros | G06F 8/65 717/173 |
| 8,341,181 B2 | 12/2012 | Lintum | |
| 8,397,051 B2 | 3/2013 | Beaman et al. | |
| 2006/0179210 A1 | 8/2006 | Saha | |
| 2010/0332471 A1 | 12/2010 | Cypher | |
| 2011/0072291 A1 | 3/2011 | Murase | |
| 2011/0126047 A1 * | 5/2011 | Anderson | H04L 9/3213 714/15 |
| 2012/0016633 A1 | 1/2012 | Wittenstein et al. | |
| 2012/0089647 A1 | 4/2012 | Jagota et al. | |
| 2013/0117516 A1 | 5/2013 | Sobolewski et al. | |

FOREIGN PATENT DOCUMENTS

| | | |
|---|---|---|
| EP | 0932863 A1 | 8/1999 |
| WO | 9900725 A1 | 1/1999 |
| WO | 2004097673 A1 | 11/2004 |

OTHER PUBLICATIONS

Apache Commons, "Commons Collection," http://commons.apache.org/proper/commons-collections/ (Last Published: Jul. 4, 2013, Last Accessed Oct. 22, 2013).

Collections15, Free Development software downloads at SourceForge.net, http://sourceforge.net/projects/collections15/ (Last Accessed Oct. 22, 2013).

(Continued)

*Primary Examiner* — Cam-Linh Nguyen
(74) *Attorney, Agent, or Firm* — Penny L. Lowry; Prentiss Johnson (57) ABSTRACT

A data set is stored in a linear data structure. A memory manager receives multiple change requests for the data set. In response to receiving, for example, a read request for the data set, the memory manager batch processes the change requests by first moving the data set into a non-linear data structure. The non-linear data structure consumes more memory resources than the linear data structure but may provide for faster processing of the change requests while eliminating duplicate data elements. The updated data set is then returned to the more memory-efficient linear data structure.

20 Claims, 4 Drawing Sheets

(56) References Cited

OTHER PUBLICATIONS

Guava-Libraries, "Collection Utilities Expanded," Guava: Google Core Libraries for Java 1.6+, https://code.google.com/p/guava-libraries/wiki/CollectionUtilitiesExpanded, (Last Accessed Oct. 22, 2013).

Heinz, S. et al, "Burst Tries: A Fast, Efficient Data Structure for String Keys," School of Computer Science and Information Technology, RMIT University, Copyright 2002 ACM 1046-8188/02/0400-0192, ACM Transactions on Information Systems, vol. 20, No. 2, Apr. 2002, pp. 192-223.

IBM, "Reducing the Cost of Data Structure Backing Store Growth in Java," IP.com No. IPCOM000191571D, IP.com No. IPCOM000191571D, IP.com Electronic Publication: Jan. 7, 2010.

Jiang, L. et al, "Low Power Consumption Data Structure Design for Embedded Applications in Real-Time Systems," 2012 IEEE 15th International Symposium on Object/Component/Service-Oriented Real-Time Distributed Computing Workshops, 978-0-7695-4669-8/12, DOI: 10.1109/ISORCW.2012.13.

* cited by examiner

FIG. 4

DATA SET MANAGEMENT USING TRANSIENT DATA STRUCTURES

BACKGROUND

The present disclosure relates to management of a data set in computer memory, and more specifically relates to management of a data set in computer memory using a primary linear data structure for processing read requests and using a transient non-linear data structure for processing change requests.

A data set is a collection of unique data elements; in other words, a data set contains no duplicate data elements. Data sets may be organized and stored in computer memory using a data structure. Selection of a data structure for storing data sets can have a significant impact on both processing speed and memory utilization. A data structure that is designed to quickly perform set operations while maintaining the uniqueness of the set may require high memory overhead. A data structure that minimizes overhead may be very slow at performing set operations while maintaining set uniqueness. Selection of a data structure for storing a particular data set may involve a compromise between processing speed and low memory consumption.

SUMMARY

Disclosed herein are embodiments of a method and computer program product for managing a data set that is stored in a linear data structure. A plurality of change requests for the data set is received. In response to determining that batch processing criteria for processing the change requests is satisfied, the data set is stored in a non-linear data structure consuming greater memory resources than the data set stored in the linear data structure. The change requests are processed using the non-linear data structure, resulting in an updated data set. The updated data set is then stored in the linear data structure consuming fewer memory resources than the updated data set stored in the non-linear data structure. In some embodiments, the resources consumed by the updated data set in the non-linear data structure are released after the updated data set is stored in the linear data structure. In some embodiments, the batch processing criteria may be, for example, the receipt of a read request for the data set, the receipt of a maximum number of change requests for the data set, or a timer expiration.

Also disclosed herein are embodiments of a system for managing a data set. Included in the system are a linear data structure and a non-linear data structure. The non-linear data structure has a lower data density than the linear data structure. Also included in the system is a memory manager configured to perform the method described above.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data set management, and more particular aspects relate to using a primary linear data structure for processing read requests targeting the data set and using a transient non-linear data structure for processing change requests targeting the data set. While the present disclosure is not necessarily limited to such applications, various aspects of the disclosure may be appreciated through a discussion of various examples using this context.

A data set is a collection of unique data elements; in other words, a data set contains no duplicate data elements. Data sets may be organized and stored in computer memory using a data structure. A data structure is an organization of information in computer memory. The study of data structures is the study of how to organize the information that an application processes in a way that improves an application's processor performance and/or reduces the application's memory consumption. To improve the application's processor performance, the organization scheme may require additional memory beyond the size of the application's data. Besides consuming sufficient memory to store the data, a data structure may consume memory used in maintaining the data structure. This extra memory, in excess of that required to store the data, is called overhead. Some data structure designs require a minimal amount of overhead, while others require a large amount of overhead. Since computer memory may be a coveted resource, data structures that minimize overhead are said to be more memory efficient. The metric used to specify how efficiently a data structure uses memory is data density, D, defined as D=information bytes/(information bytes+overhead bytes). Memory-efficient data structures have a data density that approaches one, while memory-inefficient data structures have a data density that approaches zero.

The data structure that is selected for storing data collections can have a significant impact on both processing speed and memory utilization. A high-performing data structure may be one that rapidly operates on the data. Rapid operation and minimal memory usage are usually in conflict. Data structures that are very fast normally require high memory overhead. Data structures that minimize memory overhead can be slow. Thus, the selection of the best structure for a particular application is usually a compromise between speed and overhead.

Linear data structures, such as arrays and lists, may be memory efficient due to their simple construction. Such linear data structures may also be fast when processing data set read requests; however, they may be slow when processing data set change requests. For example, a data set change request may require finding and eliminating duplicate data elements and ensuring that all data elements in the data set are unique.

Alternatively, non-linear data structures, such as sets, trees, and maps, may be fast when processing data set change requests. However, the improved processing performance may come at the price of increased memory consumption. Such high-performance non-linear data structures may be memory inefficient due to their complex construction.

A solution to the processing speed versus memory consumption issue is to use a memory-efficient linear data structure as the primary data store for a data set, and to use a high-performance non-linear data structure for processing change requests to the data set. Read requests and other operations such as Get, Contains, or Iterator that access the data set without changing the data set may be processed using the primary linear data structure. As long as the data set is only being read, the linear data structure may be the only data structure holding the data set, and a minimum amount of computer memory resources may be consumed.

When a request is received that will change the data set, such as an Add, Remove, or Intersect operation, such a request may be processed by first storing the data set in a transient non-linear data structure. The superior processing functionality of the non-linear data structure in performing duplicate, containment, and intersection tasks may provide for fast processing of the change request while ensuring that any duplicates are eliminated from the data set. After the change request is processed, the updated data set may again be stored in the memory-efficient linear data structure. The non-linear data structure may exist only when the changes are being processed.

Creating and destroying a transient non-linear data structure for each change request may adversely affect the application's performance. To minimize the computational expense of creating the non-linear data structure for the data set, change requests for the data set may be deferred for later batch processing. For example, the change requests may be stored in a secondary data structure. When criteria for processing the deferred change requests is later satisfied, then the multiple pending change requests may be processed as a batch during a single creation cycle of the transient non-linear data structure.

Figure 1:
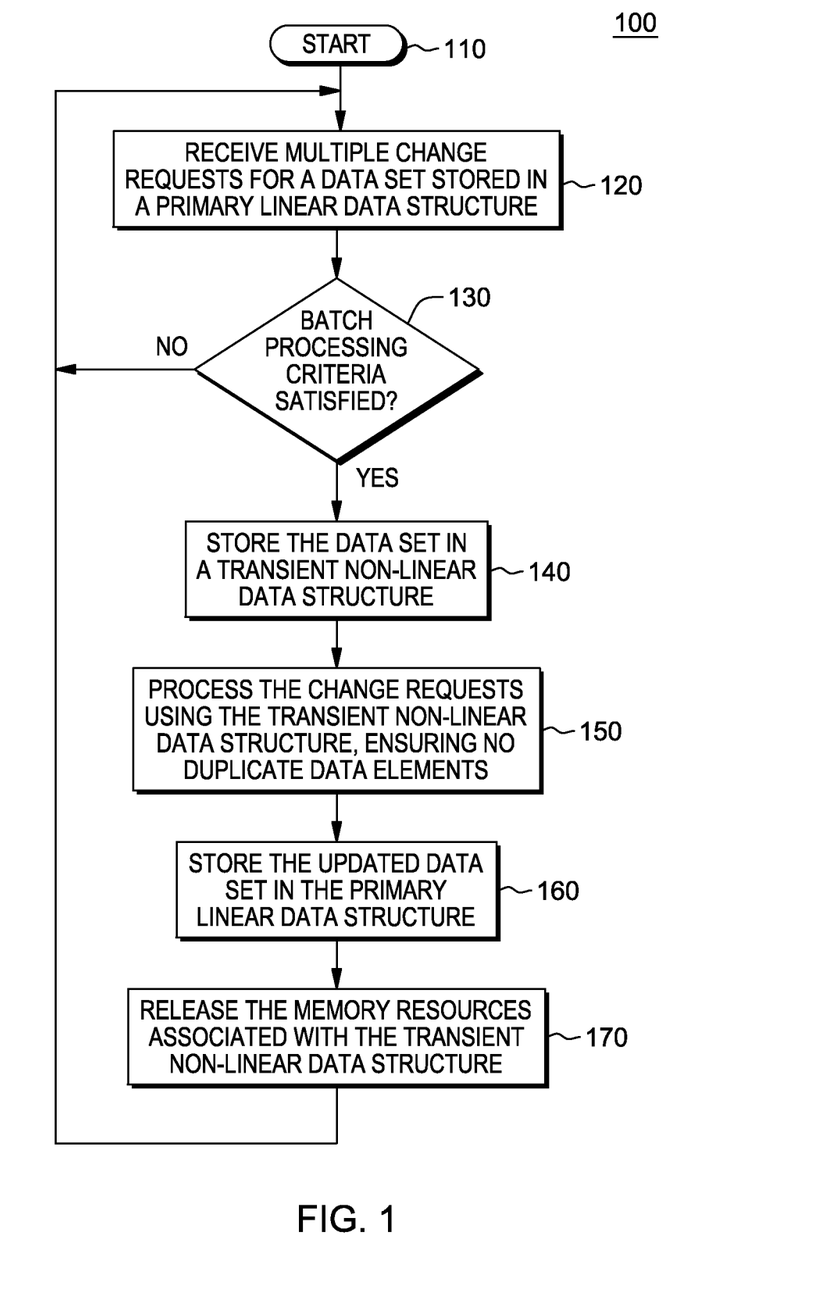
FIG. 1 depicts a flow diagram of an example method for using a transient non-linear data structure to manage changes to a data set.

FIG. 1 depicts a flow diagram of an example method 100 for using a transient non-linear data structure to manage changes to a data set while ensuring that the data set contains no duplicate data elements. Note that method 100 explicitly addresses only change requests to the data set. Read requests and other operations that access the data set without changing it are not shown. From start 110, one or more change requests may be received at 120 for a data set stored in a primary linear data structure. If batch processing criteria is satisfied at 130, then processing of the received change requests may begin.

Batch processing criteria may be satisfied, for example, when a read request is received for the data set. To ensure that the read request is processed accurately, all deferred change requests may be processed before the read request is processed. Batch processing criteria may also be, for example, a maximum number of change requests received, or the expiration of a timer. Such criteria would ensure that batch processing of the deferred change requests occurs periodically even without receiving a read request. In some embodiments, batch processing criteria may be some other criteria. For example, a secondary data structure used to store deferred change requests may be of a fixed size, and batch processing may be performed whenever the secondary data structure reaches its maximum capacity.

If batch processing criteria is satisfied at 130, then the data set may be stored in a transient non-linear data structure at 140. The data set stored in the non-linear data structure consumes more memory resources than the data set stored in the linear data structure due to the additional memory overhead of the non-linear data structure. In some embodiments, the linear data structure memory resources may be released when the non-linear data structure is created.

Once the data set is stored in the transient non-linear data structure at 140, the change requests received and deferred at 120 may be then processed at 150. Using the non-linear data structure with its superior set processing functionality may allow for much faster processing of the change requests than may be possible using the linear data structure, while ensuring the uniqueness of the elements in the data set. After the changes are processed, the updated data set may then be restored to the primary linear data structure at 160. The updated data set may be larger or smaller after the changes are processed, depending on the number of additions and deletions requested, but the updated data set stored in the linear data structure consumes fewer memory resources than the updated data set stored in the non-linear data structure due to the lower memory overhead of the linear data structure. The non-linear data structure memory resources may then be released at 170 when the updated data set is restored to the primary linear data structure. At this point, the memory resources consumed by the updated data set in the primary linear data structure may be the only memory resources consumed by the updated data set, since the transient non-linear data structure no longer exists.

Figure 2:
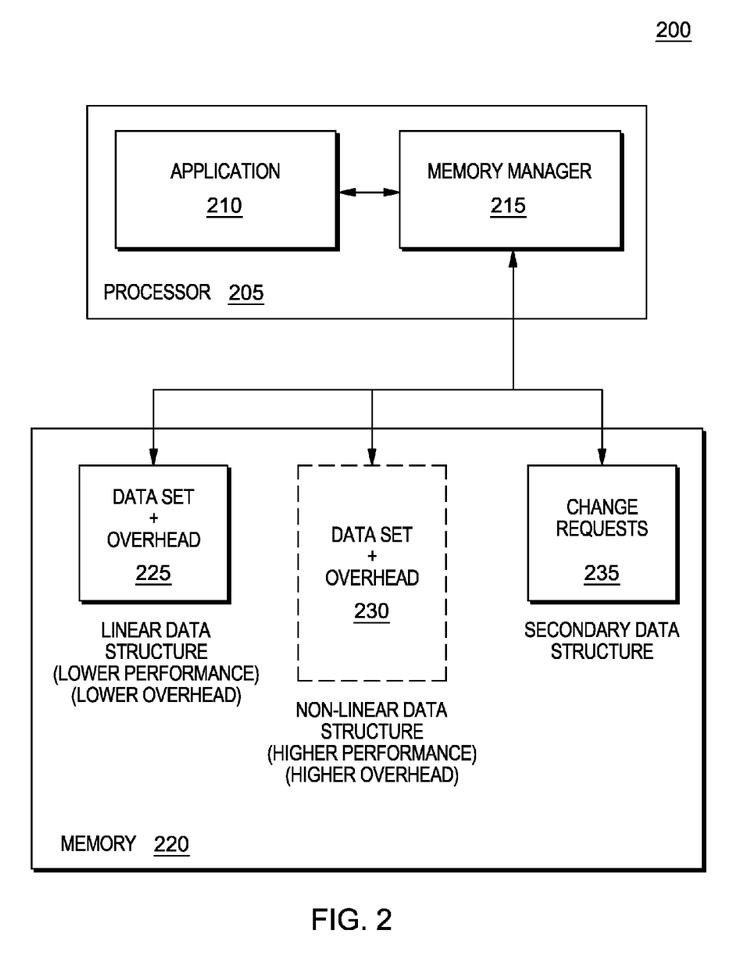
FIG. 2 depicts a block diagram of an example system for using a transient non-linear data structure to manage a data set.

FIG. 2 depicts a block diagram of an example system 200 for using a transient non-linear data structure to manage a data set. For simplicity, only a single application 210 running on a single processor 205 accessing a single memory device 220 is shown, but embodiments of a memory manager 215 may run on multiple processors, and may interact with multiple processors, multiple memory devices, and multiple applications. The memory manager 215 may receive read requests and change requests for a data set from the application 210. Although the memory manager 215 is depicted as running on the same processor 205 as the application 210, the memory manager 215 may in fact run on a different processor or run within the memory device 220.

The memory manager 215 is in communication with the memory device 220 that stores the data set in a primary linear data structure. The data set in the primary linear data structure may consume memory resources 225 of memory 220. The consumed memory resources 225 include the data set and any overhead associated with the primary linear data structure. When the memory manager 215 receives a request to access the data set from the application 210, the memory manager 215 may first determine whether satisfying the access request will result in a change to the data set. If no change will result, then the memory manager 215 may access the data set that is stored in the primary linear data structure to satisfy the request.

If the memory manager 215 determines that satisfying the access request will result in a change to the data set, then the memory manager 215 may store the change request in a secondary data structure and defer processing the request until batch processing criteria is satisfied. The secondary data structure may be of any configuration suitable for storing the change request. For example, each change request may be associated with an entry in the secondary data structure. Each entry may include an operation, such as Add, Remove, or Intersect, and may include the data elements with which to perform the operation. For example, an entry including an Add operation may contain three data elements to add to the data set.

Batch processing criteria may be satisfied, for example, when a read request is later received for the data set, or when a timer expires. In some embodiments, the memory manager 215 may need to create the secondary data structure and allocate resources 235 from memory 220 to hold the deferred requests. The memory manager 215 may defer and store multiple change requests in the secondary data structure, and then later process all the deferred change requests in a single batch process. Because the memory manager 215 may process change requests for the data set using a non-linear data structure having superior set processing functionality, batch processing of multiple change requests may minimize the impact of creating such a non-linear data structure for change request processing.

After determining that batch processing criteria is satisfied, the memory manager 215 may allocate memory resources 230 for the data set and any overhead associated with a non-linear data structure created by the memory manager 215 to more efficiently process the deferred change requests 235. The data density of the newly created non-linear data structure may be lower than the data density of the primary linear data structure, due to the increased overhead associated with faster processing of the change requests. In some embodiments, the memory resources 225 associated with the primary linear data structure may be released while the data set is stored in the non-linear data structure. Releasing memory resources 225 may conserve memory by avoiding data set duplication.

After processing the change requests using the non-linear data structure, the memory manager 215 may store the updated data set in the primary linear data structure. In some embodiments, storing the updated data set may include merging the identified updates into the existing data set stored in the primary linear data structure. In embodiments where the memory resources 225 are released while the data set is stored in the non-linear data structure, the memory manager 215 may reallocate memory resources 225 for the updated data set. The memory manager 215 may then nullify the transient non-linear data structure and release memory resources 230. In some embodiments, the memory manager 215 may also nullify the secondary data structure 235 that held the deferred change requests and release the associated memory resources.

Using a non-linear data structure on a temporary basis to perform computationally expensive update operations on a data set, while using a memory-efficient linear data structure as the primary store for the data set, may provide a solution with the advantage of storing more data set entries per unit of memory while still maintaining acceptable access rates for the data set. Note that in system 200, although memory resources 225, 230, and 235 are all consumed by processes associate with maintaining the data set, in some embodiments these resources may not be consumed simultaneously. For example, when no changes are pending for the data set, only memory resources 225 associated with the primary linear data structure may be consumed. Read requests for the data set require no additional memory resources. As change requests accumulate, memory resources 235 may be consumed in addition to memory resources 225. And when the data set is updated, memory resources 230 associated with the transient non-linear data structure may be consumed temporarily and then released, along with memory resources 235, when the update is complete.

Figure 3:
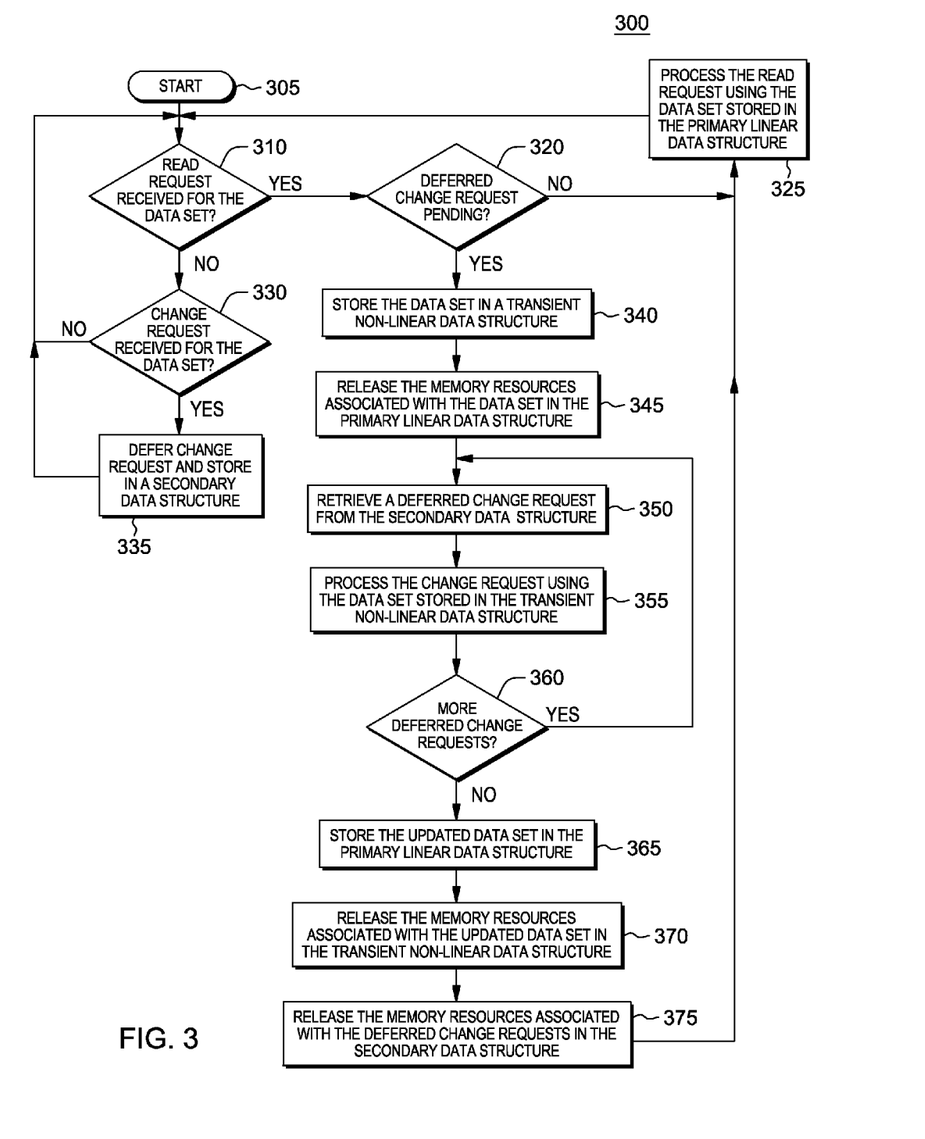
FIG. 3 depicts a flow diagram of an example method for processing read requests and change requests to a data set using a primary linear data structure and a transient non-linear data structure.

FIG. 3 depicts a flow diagram of an example method 300 for processing read requests and change requests to a data set using a primary linear data structure and a transient non-linear data structure, while ensuring that the data set contains no duplicate data elements. From start 305, if a read request from an application is received for the data set at 310, and if no deferred change requests are pending at 320, then the read request may be processed using the data set stored in the primary linear data structure at 325. If a change request from an application is received for the data at 330, then the change request may be deferred and stored in a secondary data structure at 335.

If one or more deferred change requests are pending at 320 after receiving a read request for the data set at 310, then batch processing of the deferred change requests may begin. Batch processing may begin with storing the data set in a transient non-linear data structure having set processing functionality superior to the linear data structure at 340. The data set stored in the non-linear data structure consumes more memory resources (and therefore has a lower data density) than the data set stored in the linear data structure due to the additional memory overhead associated with the superior set processing functionality. At 345, the linear data structure memory resources may be released after the data set is stored in the non-linear data structure.

A change request may then be retrieved from the secondary data store at 350 and processed using the data set in the transient non-linear data structure at 355. The retrieval and processing steps are repeated for all deferred change requests. In some embodiments, the change requests may be processed in the order that they were received, while in some embodiments, change requests may be processed out of order, if possible while maintaining the integrity of the data set. Although method 300 depicts that each change request is processed individually, in some embodiments, multiple change requests may be processed simultaneously, and some change requests may be canceled out by later change requests and therefore never processed.

When there are no more deferred change requests in the secondary data store at 360, the updated data set may then be stored in the primary linear data structure at 365. The updated data set stored in the linear data structure consumes fewer memory resources (and therefore has a higher data density) than the updated data set stored in the non-linear data structure due to the lower memory overhead of the linear data structure. The non-linear data structure memory resources may then be released at 370, the secondary data structure memory resources may then be released at 375, and the read request may be processed at 325 using the updated data set in the primary linear data structure.

Figure 4:
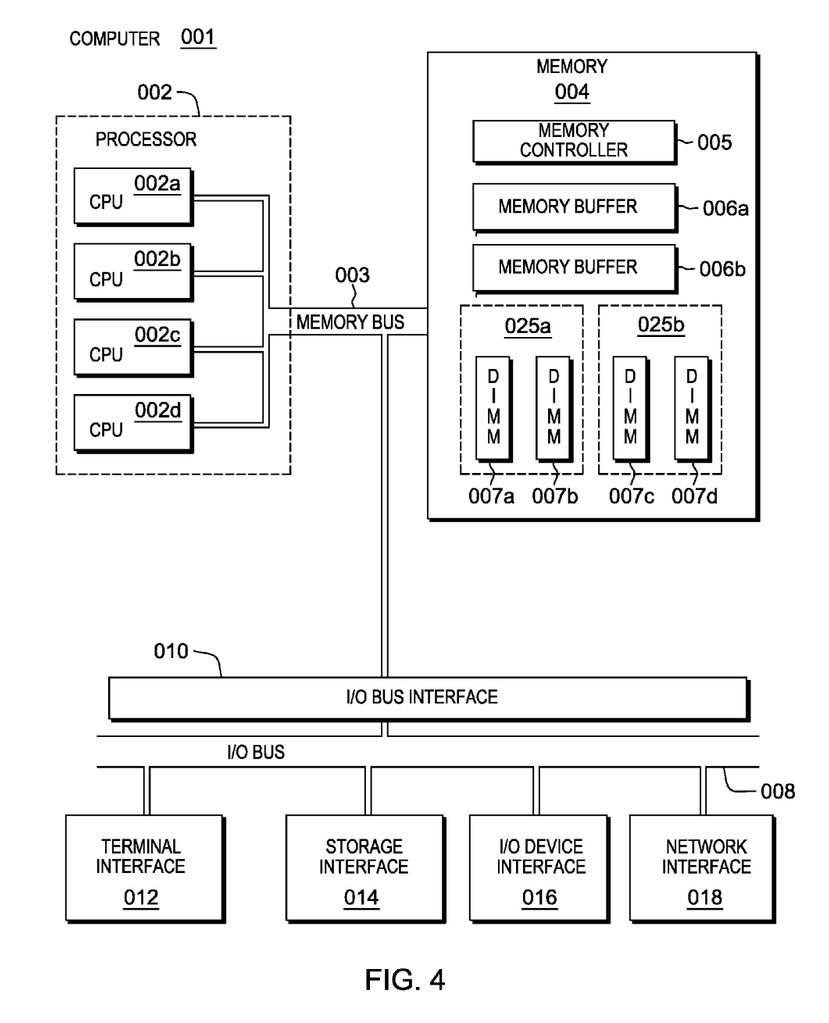
FIG. 4 depicts a high-level block diagram of an example system for implementing one or more embodiments of the invention.

FIG. 4 depicts a high-level block diagram of an example system for implementing one or more embodiments of the invention. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffers 006 and one or more memory devices 007. In the illustrated embodiment, the memory devices 007 may be dual in-line memory modules (DIMMs), which are a series of dynamic random-access memory (DRAM) chips 015a-015n (collectively referred to as 015) mounted on a printed circuit board and designed for use in personal computers, workstations, and servers. The use of DRAMs 015 in the illustration is exemplary only and the memory array used may vary in type as previously mentioned. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 4 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 4 is intended to depict the representative major components of an exemplary computer system 001. But individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be an intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM 0015 may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing a data set stored in a linear data structure, the data set in the linear data structure consuming first computer memory resources, the method comprising:
   receiving a plurality of change requests for the data set;
   determining that batch processing criteria for processing the plurality of change requests is satisfied;
   storing, in response to the determining that the batch processing criteria is satisfied, the data set in a non-linear data structure, the data set in the non-linear data structure consuming second computer memory resources, the second computer memory resources greater than the first computer memory resources;
   processing the plurality of change requests using the non-linear data structure, the processing resulting in an updated data set, the updated data set in the non-linear data structure consuming third computer memory resources; and
   storing the updated data set in the linear data structure, the updated data set in the linear data structure consuming fourth computer memory resources, the fourth computer memory resources less than the third computer memory resources.

2. The method of claim 1, further comprising:
releasing the third computer memory resources after storing the updated data set in the linear data structure.

3. The method of claim 1, further comprising:
releasing the first computer memory resources after storing the data set in the non-linear data structure.

4. The method of claim 1, wherein the linear data structure is selected from the group consisting of an array and a list, and wherein the non-linear data structure is selected from the group consisting of a set, a tree, and a map.

5. The method of claim 1, wherein the batch processing criteria is at least one of a read request received for the data set, a maximum number of change requests received for the data set, and a timer expiration.

6. The method of claim 1, further comprising:
storing the received plurality of change requests in a secondary data structure, wherein the processing the plurality of change requests includes retrieving the plurality of received change requests from the secondary data structure.

7. The method of claim 6, wherein an entry in the secondary data structure comprises an operation and at least one data element, and wherein the operation is selected from the group consisting of an add operation, a remove operation, and an intersect operation.

8. A computer program product for managing a data set stored in a linear data structure, the data set in the linear data structure consuming first computer memory resources, the computer program product comprising a computer readable storage medium having program instructions embodied therewith, the program instructions executable by a processor to perform a method comprising:
receiving a plurality of change requests for the data set;
determining that batch processing criteria for processing the plurality of change requests is satisfied;
storing, in response to the determining that the batch processing criteria is satisfied, the data set in a non-linear data structure, the data set in the non-linear data structure consuming second computer memory resources, the second computer memory resources greater than the first computer memory resources;
processing the plurality of change requests using the non-linear data structure, the processing resulting in an updated data set, the updated data set in the non-linear data structure consuming third computer memory resources; and
storing the updated data set in the linear data structure, the updated data set in the linear data structure consuming fourth computer memory resources, the fourth computer memory resources less than the third computer memory resources.

9. The computer program product of claim 8, wherein the method further comprises:
releasing the third computer memory resources after storing the updated data set in the linear data structure.

10. The computer program product of claim 8, wherein the method further comprises:
releasing the first computer memory resources after storing the data set in the non-linear data structure.

11. The computer program product of claim 8, wherein the linear data structure is selected from the group consisting of an array and a list, and wherein the non-linear data structure is selected from the group consisting of a set, a tree, and a map.

12. The computer program product of claim 8, wherein the batch processing criteria is at least one of a read request received for the data set, a maximum number of change requests received for the data set, and a timer expiration.

13. The computer program product of claim 8, wherein the method further comprises:
storing the received plurality of change requests in a secondary data structure, wherein the processing the plurality of change requests includes retrieving the plurality of received change requests from the secondary data structure.

14. The computer program product of claim 13, wherein an entry in the secondary data structure comprises an operation and at least one data element, and wherein the operation is selected from the group consisting of an add operation, a remove operation, and an intersect operation.

15. A system for managing a data set, the system comprising:
a linear data structure having a first data density;
a non-linear data structure having a second data density lower than the first data density; and
a memory manager configured to:
receive a plurality of change requests for the data set, the data set stored in the linear data structure, the data set in the linear data structure consuming first computer memory resources;
determine that batch processing criteria for processing the plurality of change requests is satisfied;
store, in response to the determining that the batch processing criteria is satisfied, the data set in the non-linear data structure, the data set in the non-linear data structure consuming second computer memory resources, the second computer memory resources greater than the first computer memory resources;
process the plurality of change requests using the non-linear data structure, the processing resulting in an updated data set, the updated data set in the non-linear data structure consuming third computer memory resources; and
store the updated data set in the linear data structure, the updated data set in the linear data structure consuming fourth computer memory resources, the fourth computer memory resources less than the third computer memory resources.

16. The system of claim 15, wherein the memory manager is further configured to release the third computer memory resources after storing the updated data set in the linear data structure.

17. The system of claim 15, wherein the linear data structure is selected from the group consisting of an array and a list, and wherein the non-linear data structure is selected from the group consisting of a set, a tree, and a map.

18. The system of claim 15, wherein the batch processing criteria is at least one of a read request received for the data set, a maximum number of change requests received for the data set, and a timer expiration.

19. The system of claim 15, further comprising:
a secondary data structure, wherein the memory manager is further configured to store the received plurality of change requests in the secondary data structure, and wherein the processing the plurality of change requests includes retrieving the plurality of received change requests from the secondary data structure.

20. The system of claim 19, wherein an entry in the secondary data structure comprises an operation and at least one data element, and wherein the operation is selected from the group consisting of an add operation, a remove operation, and an intersect operation.

* * * * *